United States Patent [19]

Chamran et al.

[11] E Re. 31,350

[45] Reissued Aug. 16, 1983

[54] PHOTODETECTOR ARRANGEMENTS AND CIRCUITS

[75] Inventors: Morteza M. Chamran, Elmhurst; Milan R. Dimovski, Countryside, both of Ill.

[73] Assignee: The Perkin-Elmer Corporation, Norwalk, Conn.

[21] Appl. No.: 358,163

[22] Filed: Mar. 15, 1982

Related U.S. Patent Documents

Reissue of:

[64] Patent No.: 4,223,215
Issued: Sep. 16, 1980
Appl. No.: 907,687
Filed: May 19, 1978

[51] Int. Cl.[3] ..... H01J 39/12

[52] U.S. Cl. ..... 250/211 R; 313/574; 313/542

[58] Field of Search ..... 250/211 R, 207; 313/94, 313/95, 103 R

[56] References Cited

U.S. PATENT DOCUMENTS 3,218,196 11/1965 Jensen et al. ..... 313/94
3,609,353 9/1971 Paine ..... 250/207
4,070,112 1/1978 Tsunazawa et al. .

FOREIGN PATENT DOCUMENTS 681272 10/1952 United Kingdom .

*Primary Examiner*—David C. Nelms
*Attorney, Agent, or Firm*—S. A. Giarratana; F. L. Masselle; R. A. Hays

[57] ABSTRACT

An improved photodetector arrangement comprises positioning a photodetector having at least one semi-transparent cathode so that the light beam striking the cathode passes through it at least twice before exiting from the photodetector. In another embodiment of the invention, a second photodetector is positioned relative to a first photodetector so that the light beam, after striking the first photodetector, strikes the second photodetector. Where the two photodetectors are employed, they may be electrically connected in parallel.

11 Claims, 5 Drawing Figures

PHOTODETECTOR ARRANGEMENTS AND CIRCUITS

Matter enclosed in heavy brackets [ ] appears in the original patent but forms no part of this reissue specification; matter printed in italics indicates the additions made by reissue.

BACKGROUND AND SUMMARY OF THE INVENTION

This invention relates to improved photodetector arrangements and circuits, and more particularly, photodetector arrangements and circuits in which the light beam strikes or passes through one or more photodetectors more than once.

In a number of analytical instruments, such as spectrophotometers, a photodetector is employed to convert photon energy from a light beam into electrical energy by photoelectric effect and the resulting electrical energy is measured to determine certain characteristics of the light beam and/or characteristics of the material from which the light beam has emanated before reaching the instrument.

The present invention is in improved arrangements of such photodetector elements and their circuits to substantially improve the efficiency of the photodetectors and to increase the spectral response range of the analytical instrument in which they may be used. In photodetector arrangements and circuits incorporating the principles of the present invention, phototubes may be used which might otherwise have previously been rejected for low energy response. Another advantage of the arrangements and circuits incorporating the principles of the present invention, is that the wavelength range of prior instruments may be extended to as much as 1000 nm without the addition of moving parts, without drastic modifications to preexisting equipment and without substantially increased expense. By extending the wavelength range of such prior spectrophotometers, it is possible to analyze for phosphates and other chemical compounds which are outside of the normal maximum 800 nm wavelength range of prior spectrophotometers. Another advantage of arrangements and circuits incorporating the principles of the present invention is the realization of increased signal-to-noise ratios of, for example, in excess of 2,000:1 at 2A. Such improved signal-to-noise ratios maximize the quantum efficiency of the equipment and render the analytical instruments useful in monitoring small changes at high absorbence or trace components at low absorbence which were previously difficult or impossible to analyze.

To one embodiment of the present invention, an improved photodetector arrangement comprises photodetector means having a cathode which is at least semi-transparent to a light beam and is capable of emitting electrons when positioned in the light beam, wherein the cathode is positioned relative to the light beam so that the light beam passes through the cathode at least twice.

In another embodiment of the present invention, return means is positioned relative to the photodetector means for returning the light beam to the cathode after the light beam has passed through the cathode twice so that the light beam strikes the cathode at least a third time.

In still another embodiment of the present invention, two photodetector means are positioned relative to each other so that the light beam, after striking the first photodetector, strikes the second photodetector.

And in still another embodiment of the present invention, at least two photodetectors are electrically coupled in parallel to each other.

These and other objects, features and advantages of the present invention will be more clearly understood through a consideration of the following detailed description.

BRIEF DESCRIPTION OF THE DRAWING

In the course of this description, reference will frequently be made to the attached drawing in which.

DESCRIPTION OF THE PREFERRED EMBODIMENTS

Figure 1:
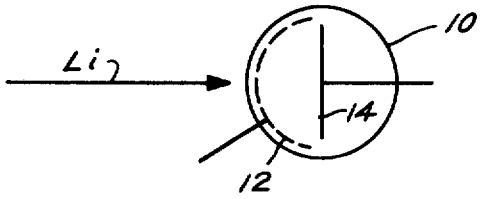
Fig. 1 PRIOR ART
FIG. 1 is a schematic view of a phototube as conventionally positioned in the prior art so that the light beam strikes its cathode once.

A conventional photocell arrangement is shown in FIG. 1. In FIG. 1 a phototube 10 is shown having a semi-transparent cathode 12 and a plate type anode 14. The phototube 10 is shown as it has been conventionally positioned in the past in analytical instruments, wherein a light beam Li directly strikes the cathode 12 once. Upon striking the cathode, the photon energy in the light beam causes an electron emission from the cathode. The magnitude of this electron emission varies with the wavelength response of the particular cathode material and the amount of energy of that wavelength contained in the light beam to which the cathode is responsive. This electron emission may be read by suitable electrical instruments from which the operator of the analytical instrument incorporating the photodetector may reach a conclusion as to one or more characteristics which are sought to be analyzed. For example, where the photodetector is in a spectrophotometer, the light beam reaching the photodetector will have emanated from a chemical composition being analyzed. Depending upon the nature of the element or elements in the composition, various strengths of given wavelengths of light will be present in the light beam Li striking the photodetector. Where the sample contains only trace quantities of elements having low absorbence qualities, or where the material is to be analyzed for small changes even at high absorbence, the photodetector must have a high energy response and/or a high signal-to-noise ratio. If it does not, certain characteristics of the compound being analyzed may go undetected.

Figure 2:
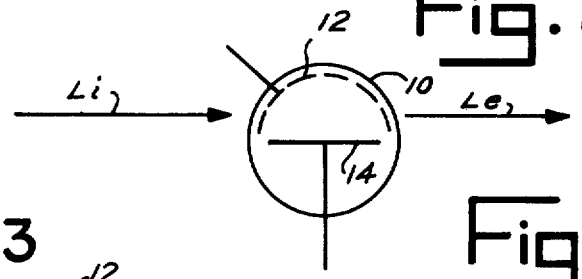
FIG. 2 is a schematic view of a photodetector arrangement incorporating the principles of the present invention in which the photodetector has been rotated so that the light beam passes through its cathode twice.

In the present invention it has been found that the emission generated by a given phototube cathode may be substantially increased for a given analysis sample or a light beam by rotating the phototube as shown in FIG. 2 about 90° from that shown in FIG. 1. Referring to FIG. 2, when the phototube is rotated about 90°, the light beam will pass through the semi-transparent cathode 12 twice, once upon entry into the phototube and again upon exiting the phototube. It has been found that such double passage of the light beam through the cathode almost doubles the sensitivity of a given phototube as will be shown later in the disclosure.

Figure 3:
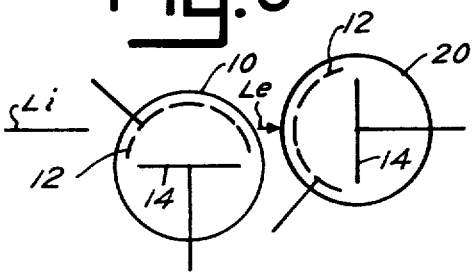
FIG. 3 is a schematic view of a second photodetector arrangement of the present invention in which a second photodetector is positioned to receive the light beam exiting from a first photodetector.

In FIG. 3 a second embodiment of photodetector arrangement incorporating the principles of the present invention is shown in which a second photodetector 20 is positioned to receive the light beam Le exiting from the first photodetector 10. In the embodiment as shown in FIG. 3, the first photodetector 10 is arranged in its rotated condition as shown in FIG. 2 so that the light beam passes through the cathode 12 of the first photodetector twice and upon exiting the first photodetector strikes the second photodetector 20.

Figure 4:
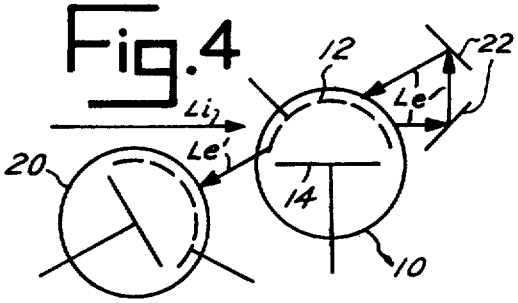
FIG. 4 is a schematic view of still another embodiment of photodetector arrangement of the present invention employing a pair of photodetectors in which the light beam exiting the first photodetector is redirected back through the photodetector prior to striking the second photodetector.

In FIG. 4 a third embodiment of photodetector arrangement is shown which also employs two photodetector 10 and 20. This arrangement of photodetectors differs from that shown in FIG. 3 in that the light beam Le exiting from the first photodetector 10 after having twice passed through its cathode 12 is redirected by a suitable mirror or prism arrangement 22 back through the cathode 12 to again pass through the cathode before the light beam Le' passes on to the second photodetector 20.

In the embodiments shown in FIGS. 3 and 4, it will be understood that although one phototube 10 is shown in which the light beam passes through the cathode more than once, more than one rotated phototube may be arranged in series to the light beam where the incoming light beam Li is of considerable strength. It will also be understood that the last phototube, e.g. 20, in the embodiments shown in FIGS. 3 and 4 may be either a vacuum photodiode or a solid state photodetector, such as a silicon photocell. In fact, such solid state photocell is desirable particularly in the multiple photodetector arrangements shown in FIGS. 3 and 4 as the last photocell because such solid state cells are extremely sensitive. This is beneficial where the light beam exiting from the first phototube or tubes is substantially weakened after passage through these preceding phototubes.

It will also be understood that although the mirror or prism arrangement 22 is shown in combination with a second photodetector in FIG. 4, that such mirror or prism arrangement may also be incorporated into the arrangement shown in FIG. 2 without the second photodetector.

Figure 5:
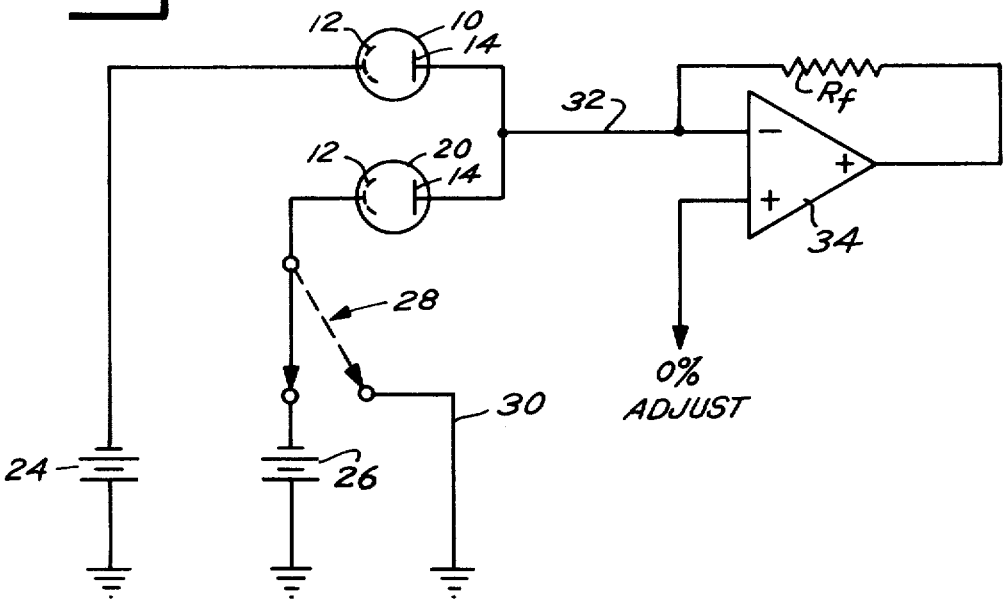
FIG. 5 is a schematic view of a suitable electronic circuit which includes the two photodetectors as shown in either FIGS. 3 or 4.

In FIG. 5 a preferred schematic electrical circuit is shown incorporating the multiple photodetector embodiments shown in FIGS. 3 and 4. The photodetectors 10 and 20 are arranged electrically in parallel to each other with the cathodes 14 of each of the photodetectors being connected to ground through batteries 24 and 26, respectively. Where the two photodetectors 10 and 20 are connected in parallel, the first photodetector 10 is preferably continuously in the system and the second photodetector 20 may be selectively connected or disconnected from the system by way of a switch 28 which may be operated by a wavelength counter (not shown). Switch 28 is operative to connect the second photodetector 20 either to ground or to its bias supply 30.

The outputs of anodes 14 of the photodetectors 10 and 20 are coupled via conductor 32 to an amplifier 34 which includes a conventional 0% adjust and resistor $R_f$ to control feedback.

Although not shown, it will be appreciated that a suitable electrical circuit similar to that shown in FIG. 4 may be employed for the single phototube embodiment shown in FIG. 2. In such circuit the electrical circuit branch containing the second photodetector 20, its battery 26 and switch 28 is eliminated.

Referring again to the arrangement shown in FIG. 2, it has been found that the efficiency of the semi-transparent photo cathode 12 is increased by rotating the photodetector 90° throughout its spectrum by almost a factor of two for the same wavelength and light level. By such rotation, a simple single stage semi-transparent photodetector is effectively operated as a two-stage photodetector without having to use the high voltages normally associated with photomultipliers or multiple photodetectors. Such increase in efficiency allows either the use of low efficiency photodetectors which were not otherwise previously acceptable in many analytical instruments or, conversely, where the photodetector is of high efficiency, the sensitivity of the instrument is substantially increased. It has been found that rotation of the photodetector as shown in FIG. 2 does not result in degradation of other factors such as photometric accuracy, dark current, drift or fatigue.

Where the second photodetector is employed as in the embodiments shown in FIGS. 3 and 4, not only is the quantum efficiency of the system further increased, but also the cathode 12 of the second photodetector cathode may differ from the cathode of the first photodetector to increase the wavelength range of the analytical instrument. For example, the cathode of the first photodetector 10 may have an S-20 surface which has a response of from 190–800 nm or an S-5 surface having a response of from 190–600 nm. On the other hand the cathode of the second photodetector 20 may have an S-1 surface having a response of from 350–1000 nm or it can be a solid state photocell. Where the cathode of the first photodetector 10 is an S-20 surface and of the second photodetector 20 is an S-1 surface, the spectral range of the instrument will be increased to about 190–1000 nm. The switch 28 as shown in FIG. 5 is particularly advantageous where the second photodetector has an S-1 surface due to the relative noisiness of such surface.

By way of example, experimental data was obtained using a Perkin-Elmer Model 55, single beam UV-VIS-NIR spectrophotometer. A comparison of the output energy for both a single phototube positioned as shown in FIG. 1 and a single phototube positioned in accordance with the invention as shown in FIG. 2 both of which have S-20 cathodes is shown in the following table. In addition, the table also shows the output of a photodetector arrangement as shown in FIG. 3 having first and second photocells having S-20 and S-1 cathodes, respectively.

| Wavelength in Beam Li | Conventional Arrangement (FIG. 1) | Rotated Arrangement (FIG. 2) | Combination Arrangement (FIG. 3) |
|---|---|---|---|
| 190 nm | 53 mV | 104 mV | 100 mV |
| 200 | 158 | 319 | 294 |

-continued

| Wavelength in Beam Li | Conventional Arrangement (FIG. 1) | Rotated Arrangement (FIG. 2) | Combination Arrangement (FIG. 3) |
|---|---|---|---|
| 300 | 247 | 450 | 420 |
| 325 | 204 | 380 | 356 |

The preceding four readings were with a deuterium lamp. The following readings were with a tungsten lamp.

| | | | |
|---|---|---|---|
| 300 | 55 | 104 | 101 |
| 325 | 166 | 325 | 315 |
| 350 | 325 | 661 | 630 |
| 400 | 1825 | 3170 | 3020 |
| 450 | 2030 | 2880 | 2800 |
| 500 | 1920 | 2580 | 2530 |
| 550 | 2150 | 2790 | 2770 |
| 600 | 2400 | 3090 | 3140 |
| 650 | 2450 | 3120 | 3200 |
| 700 | 2910 | 3570 | 3760 |
| 750 | 3390 | 4640 | 5000 |
| 800 | 750 | 1576 | 1870 |
| 825 | 430 | 1094 | 1370 |
| 850 | 230 | 763 | 1000 |
| 875 | 100 | 437 | 680 |
| 900 | 24 | 127 | 365 |
| 910 | 11 | 64 | 285 |
| 920 | 6 | 31 | 236 |
| 930 | 3.8 | 15 | 201 |
| 940 | 2.8 | 8.5 | 170 |
| 950 | 2.3 | 5.5 | 142 |

It will be understood that the embodiments of the present invention which have been described are merely illustrative of a few of the applications of the principles of the invention. Numerous modifications may be made by those skilled in the art without departing from the true spirit and scope of the invention.

What is claimed is:

1. An improved photodetector arrangement comprising photodetector means having a cathode which is at least semi-transparent to a light beam, said cathode having the capability of emitting electrons when positioned in said light beam, said cathode being contoured and positioned relative to said light beam so that said light beam passes through said cathode at least twice while following a substantially single linear path *through and out of said photodetector means.*

2. The arrangement of claim 1 including return means for returning said light beam to said cathode after said light beam has passed through said cathode twice, so that said light beam strikes said cathode at least a third time.

3. The arrangement of claim 1 wherein said photodetector means is a phototube.

4. The arrangement of claim 1 including second independent photodetector means positioned so that said light beam strikes said second photodetector means after said light beam has passed through the cathode of said first photodetector means at least twice.

5. The arrangement of claim 4, wherein said second photodetector means is a solid state photodetector.

6. The arrangement of claim 4 wherein said first and second photodetector means are responsive to light in differing wavelength ranges.

7. The arrangement of claim 6 wherein said first photodetector means is responsive to light in the range of about 190–800 nm and said second photodetector means is responsive to light in the range of about 800–1000 nm.

8. The arrangement of claim 4 wherein said first and second photodetector means are electrically coupled in parallel to each other.

9. The arrangement of claim 8 including switch means for selectively uncoupling said second photodetector means from the parallel electrical circuit with said first photodetector means.

10. The arrangement of claim 1 further including second independent photodetector means electrically coupled to the first photodetector means in parallel relationship.

11. The arrangement of claim 10, wherein said first photodetector means is responsive to light in the range of from about 190 nm to about 800 nm and said second photodetector means is responsive to light in the range of from about 800 nm to about 1000 nm; and further including switch means for selectively uncoupling said second photodetector means from the parallel electrical circuit with said first photodetector means.

* * * * *